United States Patent
Nishida

(10) Patent No.: US 7,213,550 B2
(45) Date of Patent: May 8, 2007

(54) INTERNAL COMBUSTION ENGINE AND VALVE TIMING CONTROL METHOD

(75) Inventor: Hideyuki Nishida, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/732,483

(22) Filed: Dec. 11, 2003

(65) Prior Publication Data

US 2004/0129238 A1   Jul. 8, 2004

(30) Foreign Application Priority Data

Jan. 6, 2003   (JP)   ............................. 2003-000194

(51) Int. Cl.
  *F01L 1/34* (2006.01)
(52) U.S. Cl. .................. 123/90.15; 123/347; 123/403
(58) Field of Classification Search ............ 123/90.11, 123/90.15, 90.16, 90.17, 90.27, 90.31, 347, 123/348, 403, 404, 405, 435, 676, 90.18, 123/345, 346, 309
See application file for complete search history.

(56) References Cited

U.S. PATENT DOCUMENTS 4,958,606 A * 9/1990 Hitomi et al. ............. 123/316
5,024,191 A * 6/1991 Nagahiro et al. ......... 123/198 D
6,550,444 B2 * 4/2003 Shiraishi et al. ............ 123/294

FOREIGN PATENT DOCUMENTS

| JP | A 3-9026 | 1/1991 |
| JP | A-7-34881 | 2/1995 |
| JP | A 8-284669 | 10/1996 |
| JP | A-9-209765 | 8/1997 |
| JP | A-11-229913 | 8/1999 |
| JP | A 2000-328971 | 11/2000 |
| JP | A 2001-234762 | 8/2001 |
| JP | A-2002-106357 | 4/2002 |
| JP | A-2002-147261 | 5/2002 |

* cited by examiner

*Primary Examiner*—Ching Chang
(74) *Attorney, Agent, or Firm*—Oliff & Berridge, PLC

(57) ABSTRACT

An internal combustion engine includes: a variable valve timing mechanism for changing a valve timing of at least one of an intake valve and an exhaust valve; a pressure for detecting an intake pressure and an exhaust pressure of the internal combustion engine that pulsate in association with the actions of the piston, the intake valve, and the exhaust valve; and controller for setting the valve timing based on a magnitude relationship between the intake pressure and the exhaust pressure detected by the pressure detector.

14 Claims, 14 Drawing Sheets

F I G. 10A
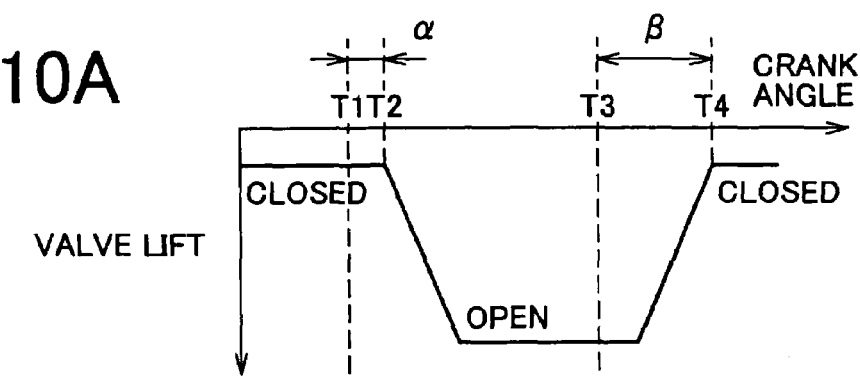
F I G. 10B
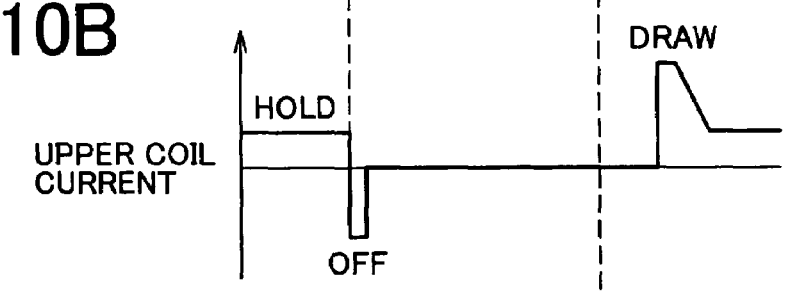
F I G. 10C
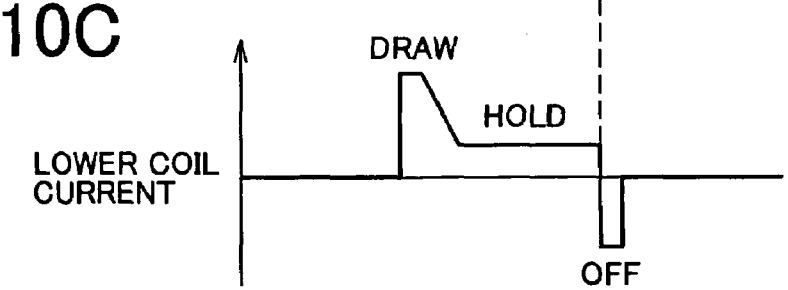

FIG. 13
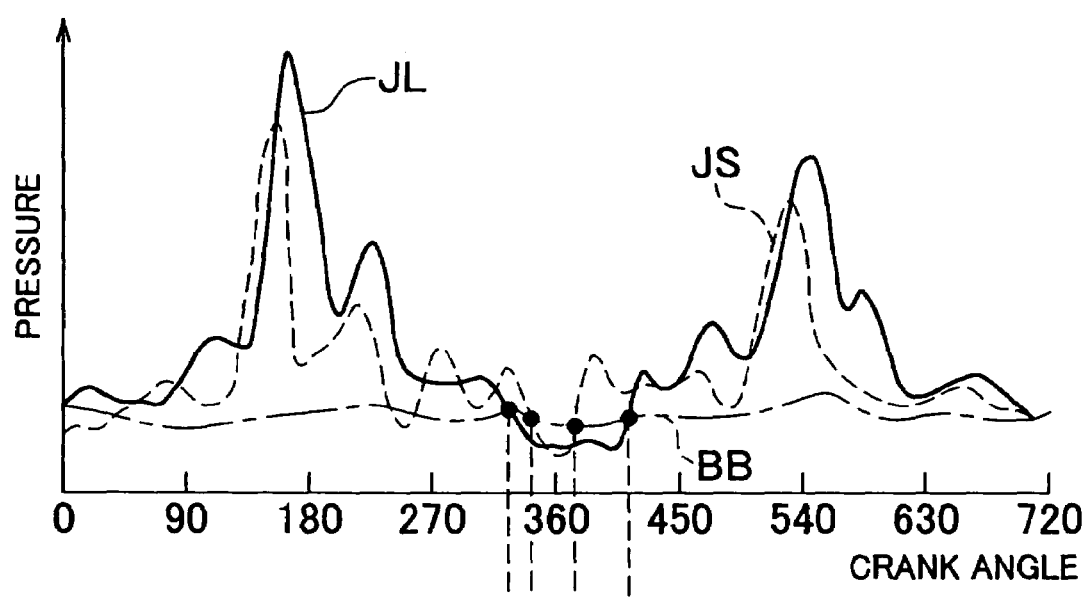
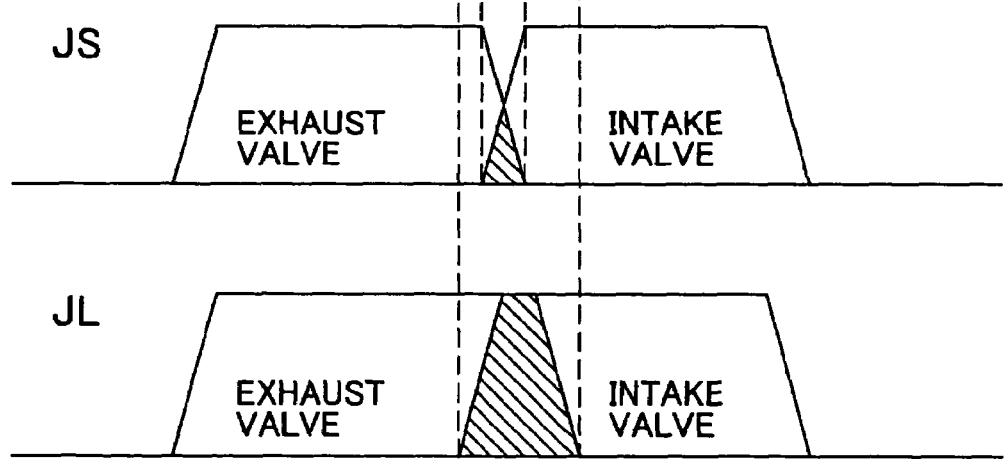

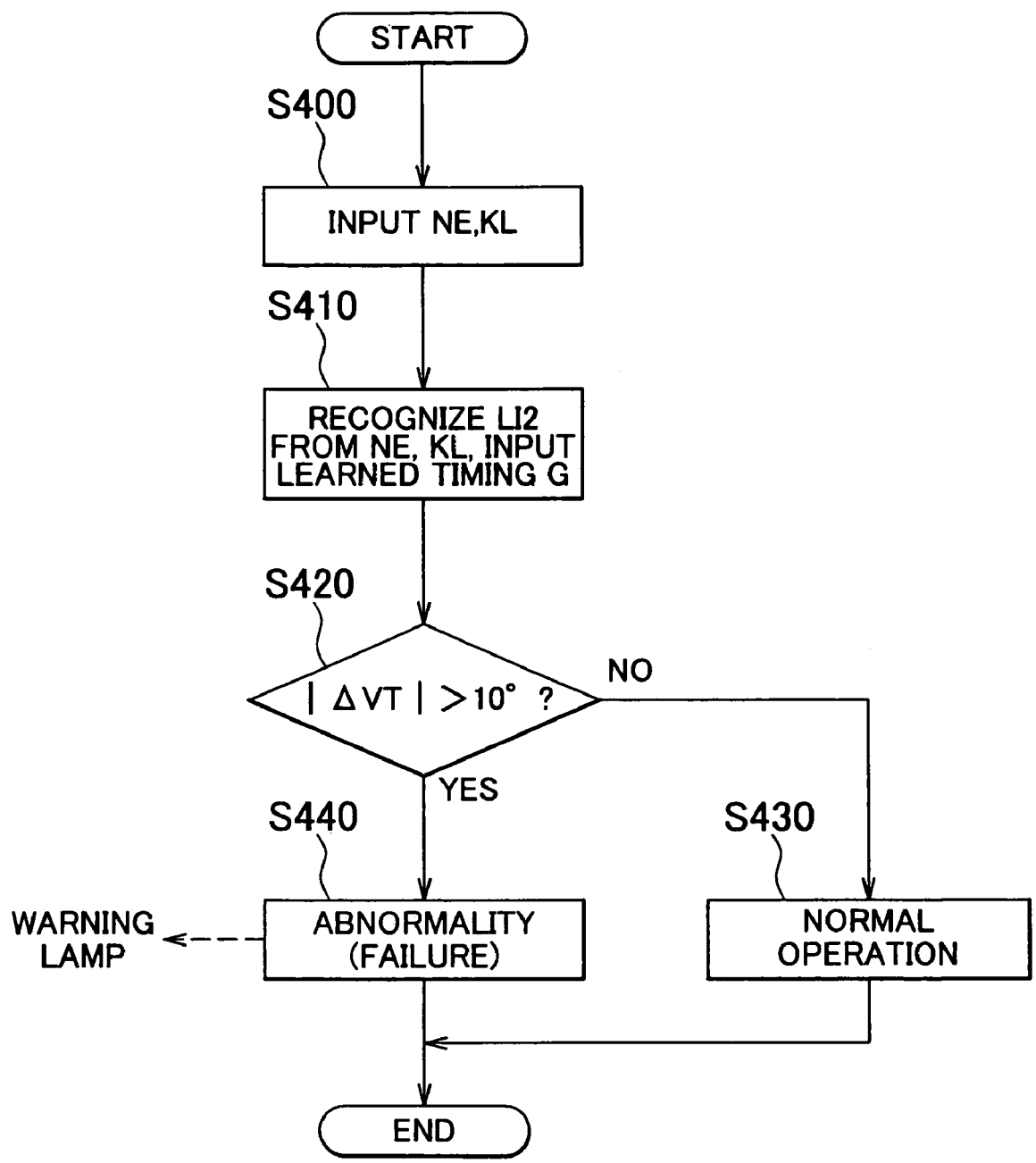

INTERNAL COMBUSTION ENGINE AND VALVE TIMING CONTROL METHOD

The disclosure of Japanese Patent Application No. 2003-000194 filed on Jan. 6, 2003, including the specification, drawings and abstract is incorporated herein by reference in its entirety.

BACKGROUND OF THE INVENTION

1. Field of the Invention

The invention relates to an internal combustion engine equipped with a control mechanism for controlling the timing of opening/closing the intake and exhaust valves and to a control method thereof.

2. Description of the Related Art

It is known that in the internal combustion engines, intake air and exhaust air pulsate in their respective pipes in association with the opening and closing actions of valves and the actions of pistons. Such intake pressure pulsation and exhaust pressure pulsation typically occur due to "reflection" of pressure changes caused by the intake valves and the exhaust valves, and such reflection can occur at a surge tank, a catalytic converter, etc., which are provided in the intake and exhaust passageways, more specifically at their openings or portions having an increased-sectional area. If the cycle of such intake and exhaust pulsation and the opening/closing timing of the intake and exhaust valves are synchronized, the inflow of fresh air from the intake pipe into the combustion chambers will be accelerated so as to improve the intake charge efficiency, and the efficiency of discharging burned gas from the combustion chambers into the exhaust pipe will be improved.

In association with this, there are known technologies in which intake pulsation and intake inertia effect are utilized to adjust the intake charge efficiency so as to increase the engine output. A known internal combustion engine that adopts such a technology includes a valve characteristic switching mechanism for controlling the cam operation angle by switching between two cams provided on an intake camshaft, a valve phase varying mechanism capable of changing the opening/closing timing of the intake valves to a retarded side and an advanced side by controlling the rotation phase of the intake camshaft, and intake pipe length changing mechanism for changing the characteristic frequency of pressure waves of intake pulsation and thereby adjusting the synchronization characteristic by changing the length of the intake pipe. In this internal combustion engine, intake pulsation and the intake inertia effect corresponding to the engine rotation speed can be achieved by changing the operation angle of the intake cams stepwise, and changing the phase of the intake cams (to the retarded or advanced side), and changing the period of intake pulsation stepwise. Thus, this internal combustion engine is advantageous in increasing the output. As a patent literature that describes the foregoing internal combustion engine technology, the following Patent Literature 1 is cited.

[Patent Literature 1]

Japanese Patent Application Laid-Open Publication No. 2000-328971

With regard to the exhaust side, a technology is known in which the exhaust pressure is detected and the opening/closing timing of the valves is accordingly set so as to improve the scavenging efficiency that depends upon exhaust pulsation, and therefore improve the intake charge efficiency. As a patent literature that describes such an internal combustion engine technology, the following Patent Literature 2 is cited.

[Patent Literature 2]

Japanese Patent Application Laid-Open Publication No. 11-22499

However, a problem with the above-described internal combustion engines is that it is difficult to always realize optimal valve timing. That is, even if the intake cam phase is set based on experimental values or design values so as to achieve an optimal valve timing in a certain operation region, that timing can not always be optimal in fact since the manner or characteristic of the above-stated intake pulsation changes due to aging changes or individual differences of the engine, etc. Furthermore, if cams are employed to open and close the valves, a correlation exists between the opening timing and the closing timing of the valves, so that the regions where the intake pulsation is sufficiently utilized during various states of engine operation are limited. That is, there are many regions where the dynamic effect of intake cannot be fully utilized due to insufficient response to variations of intake pulsation depending on the state of operation.

SUMMARY OF THE INVENTION

It is an object of the invention to solve the aforementioned problems, that is, automatically select optimal valve opening/closing timings by utilizing the intake and exhaust pressure pulsations in various operation states of an internal combustion engine, so as to improve the performance of the engine.

In order to achieve the aforementioned object at least partially, an internal combustion engine in accordance with a first aspect of the invention adopts the following construction. That is, an internal combustion engine includes a cylinder; a piston; an intake valve; an exhaust valve; a variable valve timing mechanism enabling an operation timing of at least one of the intake valve and the exhaust valve to be changed; a pressure detector that detects an intake pressure and an exhaust pressure within the internal combustion engine, each pulsates in association with the actions of the piston, the intake valve, and the exhaust valve; and controlling-means that sets the operation timing based on a magnitude relationship between the intake pressure and the exhaust pressure detected by the pressure detector.

Also, the invention relates to a method for controlling combustion of an internal combustion engine including a cylinder, a piston, an intake valve, an exhaust valve, and a variable valve timing mechanism capable of changing a timing of operating at least one of the intake valve and the exhaust valve. The method includes: detecting an intake pressure and an exhaust pressure within the internal combustion engine which pulsate in association with the actions of the piston, the intake valve, and the exhaust valve; and setting the operation timing of each valve based on a magnitude relationship between the intake pressure and the exhaust pressure.

According to the internal combustion engine of the first aspect of the invention and the method of controlling the same engine, despite changes in various states of operation of the internal combustion engine, for example, changes in the engine rotation speed, etc., both the pulsating intake pressure and the pulsating exhaust pressure in the present state are detected. On the basis of the magnitude relationship between the intake pressure and the exhaust pressure, the valve opening/closing timing is set. The variable valve timing means causes the valves to open and close using the set opening/closing timing. That is, even though the period and amplitude of the exhaust pressure pulsation and the intake pressure pulsation change depending of the states of operation, desired valve timing in the present state can be determined and therefore the valve opening/closing timing can be arbitrary set. Hence, the valve timing can be set by utilizing the intake pressure pulsation and the exhaust pressure pulsation in accordance with needs.

In the engine described above, it is preferable that the setting of the operation timing be such that a timing of completing an opening or closing action of the valve is determined based on the magnitude relationship between the intake pressure and the exhaust pressure detected by the pressure detector, and a timing of starting such action of the valve is set so as to complete the action of the valve at the determined timing.

In the method described above, it is preferable that the setting of the operation timing be such that a timing of completing an opening or closing action of the valve is determined based on the magnitude relationship between the intake pressure and the exhaust pressure, and a timing of starting such action of the valve is set so as to complete the action of the valve at the determined timing.

With the engine or the method thus modified, the timings at which the valves start to open and the timings at which the valves are completely closed are calculated on the basis of a result of detection of the intake pressure and the exhaust pressure. On the basis of the calculated timings, the timings of start of valve actions are set so that the valve actions will be completed. Therefore, it becomes possible to set valve timings factoring in the transition time and the response delay of the valves.

The controlling means may be means for setting the opening timing of the exhaust valve so that a negative pressure wave that forms a minimum pressure portion of exhaust pressure that pulsates in a cylinder of the internal combustion engine reaches a vicinity of the exhaust valve at a timing of an exhaust-stroke top dead center of the piston. By advancing or retarding the opening timing of the exhaust valve, the phase of the exhaust pressure pulsation is adjusted. Due to this adjustment, the negative pressure wave that forms a minimum pressure portion of the pulsating exhaust pressure reaches the vicinity of the exhaust valve at the timing of the top dead center of the exhaust stroke of the piston (during the overlap period during which both the intake valve and the exhaust valve are open). Therefore, the burned gas is drawn out due to negative pressure, so that the scavenging efficiency will improve and the intake charge efficiency will improve.

Furthermore, the controlling means may be means for setting the closing timing of the intake valve based on a timing at which a positive pressure wave that forms a maximum pressure portion of intake pressure that pulsates in a cylinder of the internal combustion engine reaches a vicinity of the intake valve of the cylinder. The intake valve is closed after the positive pressure wave that forms a maximum pressure portion of pulsating intake pressure has reached the vicinity of the intake valve. Therefore, a phenomenon in which air-fuel mixture charged in the chamber flows back to the intake side is prevented.

The internal combustion engine of the invention may further include a variable intake/exhaust system that changes at least one of an effective pipe length and a pipe inside diameter of each one of an intake pipe and an exhaust pipe. In such an internal combustion engine, the amplitude and period of the intake pressure pulsation and the exhaust pressure pulsation can be changed by changing the pipe lengths and the pipe inside diameters of the intake and exhaust pipes via the variable intake/exhaust system. As a result, in a certain region, the dynamic effect of pulsation is utilized so as to improve the intake charge efficiency. Even if the amplitude and the period of pressure pulsation are changed by the variable intake/exhaust system, the valve timings are set on the basis of the pressures detected in the present condition. Therefore, appropriate valve timings can be set over a broad range instead of only a limited region, so that the performance of the internal combustion engine can be improved.

Furthermore, the controlling means may determine whether the variable intake/exhaust system has an abnormality based on at least one of a pressure in the intake pipe and a pressure in the exhaust pipe which reflects the effective pipe length and the pipe inside diameter of each pipe. Even if a change in the effective pipe length or the pipe inside diameter cannot be achieved by the variable intake/exhaust system due to a failure or malfunction, the valve timings are set in accordance with the pressures detected in the present situation. Furthermore, by comparing the valve timing corresponding to that situation with a valve timing learned or detected before, the site of a failure or malfunction in the variable intake/exhaust system can be determined. Therefore, the location of abnormality in the intake system and the exhaust system can be identified, thereby contributing to fault diagnosis.

Furthermore, in the internal combustion engine, the pressure detecting means may include sensors provided in an intake pipe and an exhaust pipe of each one of a plurality of cylinders of the internal combustion engine. Each cylinder may be provided with a pressure sensor, and the valve timing suitable for each cylinder may be set on the basis of the pulsating intake pressure and the pulsating exhaust pressure detected via the pressure sensor of each cylinder. Therefore, it becomes possible to set valve timings corresponding to small differences in the intake/exhaust pressure fluctuations among the cylinders.

Furthermore, the valve timing change means may include an electromagnetic valve actuation mechanism that uses electromagnetic force to open and close a valve. The electromagnetic valve actuation mechanism that utilizes electromagnetic force controls the opening and closing actions of the valves by adjusting the magnetizing current supplied through coils. Therefore, the valve timings can be set independently of the rotation of the crankshaft of the internal combustion engine. The valve timings may also be set through the use of a mechanical variable valve actuation mechanism.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIGS. 10A to 10C are diagrams indicating relationships between the crank angle and the valve opening/closing response delay.

FIG. 13 is a diagram indicating relationships of the crank angle with the intake pressure and the exhaust pressure in the valve timing control of the third embodiment.

FIG. 14 is a flowchart illustrating an abnormality determination process for a variable intake system.

DETAILED DESCRIPTION OF PREFERRED EMBODIMENTS

Figure 1:
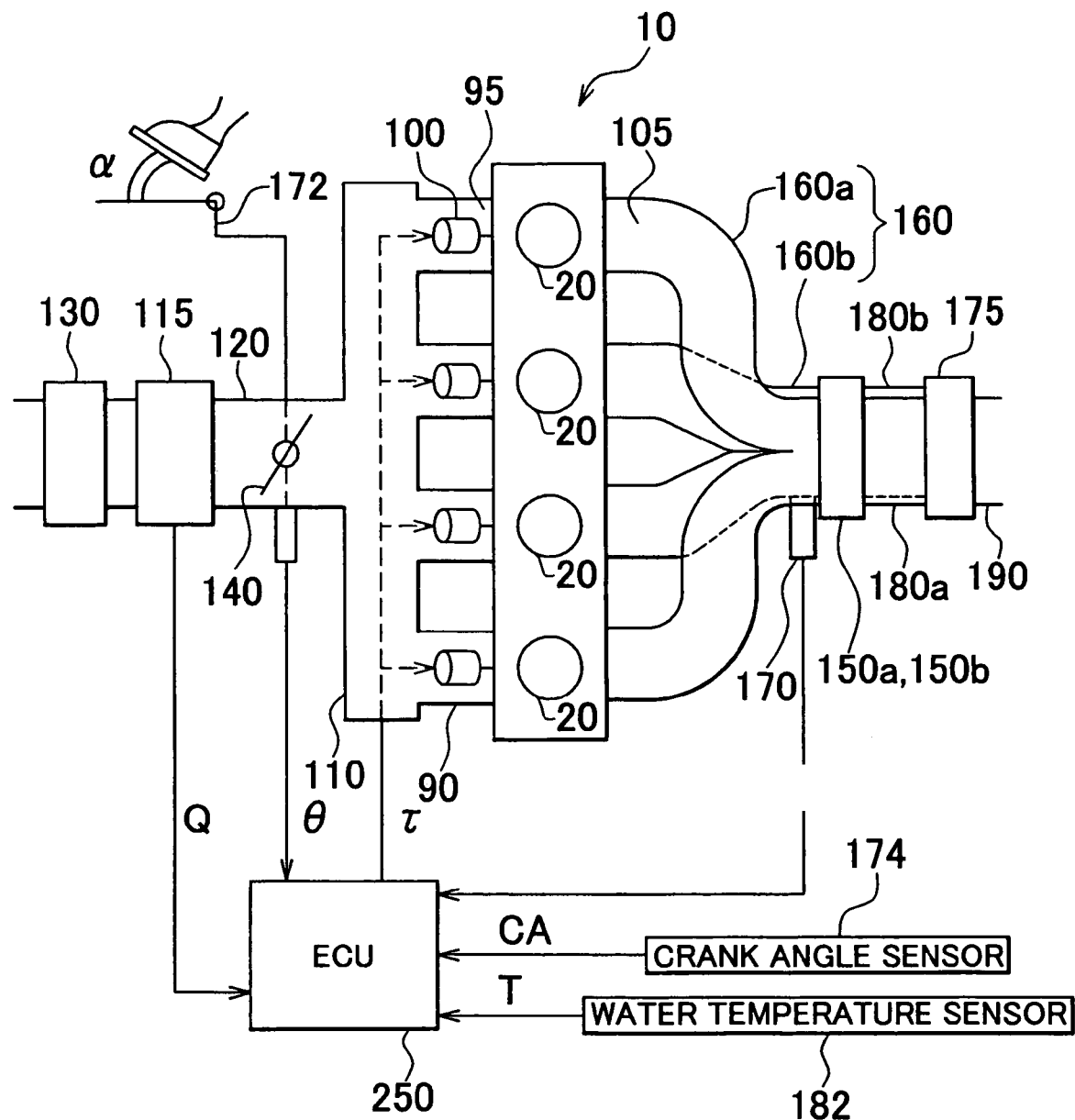
FIG. 1 is a schematic block diagram illustrating the construction of a system in which an internal combustion engine in accordance with a first embodiment of the invention is installed.
Figure 2:
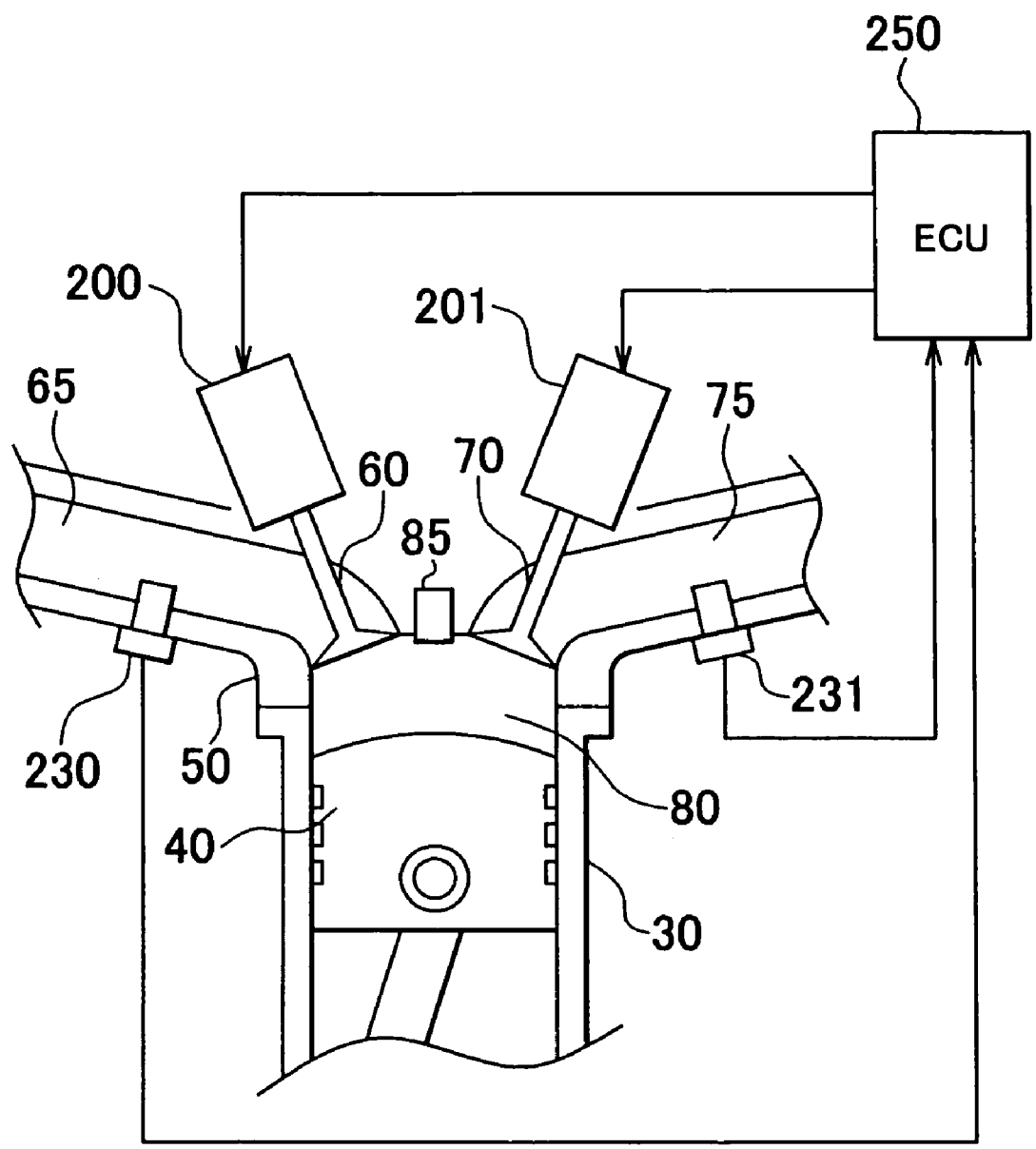
FIG. 2 is a schematic longitudinal sectional view of a cylinder.

Preferred embodiments of the invention will be described hereinafter with reference to the accompanying drawings. FIG. 1 is a schematic block diagram illustrating the construction of an internal combustion engine 10 according to a first embodiment of the invention. FIG. 2 schematically shows a longitudinal section of each cylinder 20 of this engine 10. The engine 10 is a four-cylinder engine having four cylinders 20. The engine 10 includes a cylinder block 30, pistons 40 that reciprocate within the cylinder block 30, a cylinder head 50, intake valves 60 and exhaust valves 70 disposed on the cylinder head 50, etc. The engine 10 adopts a four-valve system in which each cylinder 20 is provided with two intake valves 60 and two exhaust valves 70. Each cylinder 20 has a combustion chamber 20 that is surrounded and thus defined by the cylinder block 30, the cylinder head 50 and the corresponding one of the pistons 40. The cylinder head 50 is provided with ignition plugs 85 for igniting compressed air-fuel mixture within the combustion chambers 20.

The cylinder head 50 has input ports 65 that are connected to an intake manifold 90. The intake manifold 90 has therein intake passageways 95 that are provided with fuel injection valves 100. The fuel injection valves 100 inject an amount T of fuel corresponding to the state of engine operation into the respective cylinders 20. The intake manifold 90 connected to the cylinders 20 is connected to an intake duct 120 via a surge tank 110. The intake duct 120 is provided with an air flow meter 115 for detecting the amount Q of intake air. The intake duct 120 is connected to an air cleaner 130. Thus, air filtered via the air cleaner 130 is taken in. The air flow meter 115 detects the amount Q of intake air for an air-fuel ratio control for achieving an appropriate air-fuel mixture. The intake duct 120 is provided with a throttle valve 140 that adjusts the amount of air supplied to the engine 10.

The cylinder head 50 has exhaust ports 75 that are connected to an exhaust manifold 160. The exhaust manifold 160 is constituted by two exhaust branch pipes 160a and 160b, forming a generally-termed dual exhaust system in which two cylinders that do not interfere with each other in the combustion sequence are connected to a single exhaust passageway. Each of the exhaust branch pipes 160a, 160b has two exhaust passageways 105, and the end of each two exhaust passages 105 where they join together is connected to a collecting pipe 180a or 180b via a catalytic converter 150a or 150b. The collecting pipes 180a, 180b are both connected to an exhaust pipe 190 via another catalytic converter 175.

The exhaust gasses from the first cylinder and the fourth cylinder flow through the exhaust branch pipe 160a, and then merge to flow through the collecting pipe 180a. The exhaust gasses from the third cylinder and the second cylinder flow through the exhaust branch pipe 160b, and then merge to flow through the collecting pipe 180b. The exhaust gases from all the cylinders 20 finally merge in the exhaust pipe 190. Exhaust gas is substantially purified by the catalytic converters, 150a, 150b, 175 before being let out. Each of the exhaust branch pipes 160a, 160b of the exhaust manifold 160 has an oxygen concentration sensor 170 for detecting the concentration of oxygen in exhaust gas. The intake port 65 and the exhaust port 75 of each cylinder 20 are provided with pressure sensors 230, 231 for detecting the pulsating pressure in the intake ports 65 and the pulsating pressure in the exhaust ports 75. The pressure sensors 230, 231 are connected to an ECU 250 that will be described below.

Figure 3:
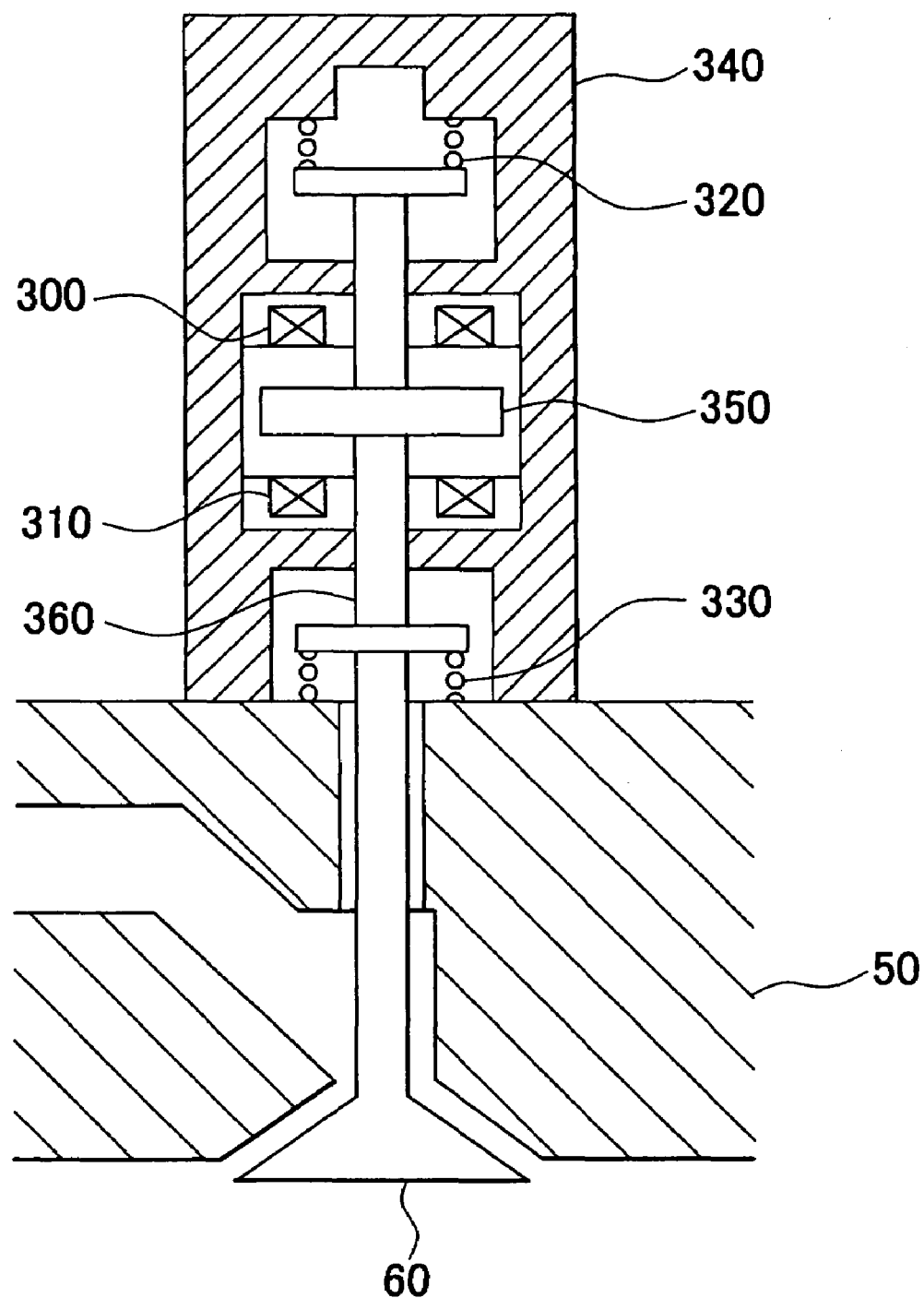
FIG. 3 is a schematic sectional view of an intake valve electromagnetic actuation mechanism.

The cylinder head 50 is provided with electromagnetic valve actuation mechanisms 200, 201 that open and closes the intake valve 60 and the exhaust valves 70 using electromagnetic force. A schematic sectional view of the electromagnetic valve actuation mechanism 200 is shown in FIG. 3. Note that the exhaust valve-side structure is substantially the same as shown in FIG. 3. Referring to the figure, the electromagnetic valve actuation mechanism 200 includes a flange 340, springs 320, 330, an upper electromagnetic coil 300, a lower electromagnetic coil 310, an armature 350, and a shaft 360. The shaft 360 is arranged in contact with one end of an intake valve 60 such that it can move together with the intake valve 60 back and forth along its axial direction. Above and below the shaft 360 in its axial direction are disposed the springs 320, 330 each supporting the shaft 360. Via the shaft 360, the springs 320, 330 hold the intake valve 60 at a neutral position between an open valve position and a closed valve position The armature 350, made of a soft magnetic material, is provided near the center of the shaft 360. The flange 340 is provided with the upper electromagnetic coil 300 and the lower electromagnetic coil 310, which are disposed above and below the armature 350.

When the upper electromagnetic coil 300 is supplied with magnetizing current, electromagnetic force is generated so that the armature 350 is attracted toward the upper electromagnetic coil 300. As the armature 350 is thus moved (i.e., as the shaft 360 is moved), the intake valve 60 closes. When the lower electromagnetic coil 310 is supplied with magnetizing current, electromagnetic force is generated so that the armature 350 is attracted toward the lower electromagnetic coil 310. As the armature 350 is thus moved, the intake valve 60 opens. By adjusting the timing of supplying current to the upper electromagnetic coil 300 and the lower electromagnetic coil 310, the opening/closing timing of each valve is controlled. The ECU 250 computes the timings of opening and closing the valves as described below using signals from the pressure sensors 230, 231 provided in the intake and exhaust ports 65, 75, and determines the timings of supplying current the electromagnetic valve actuation mechanisms 200, 201.

As well as the above control for valve opening/closing timings, the ECU 250 executes various other controls regarding the amount of fuel injection τ, the fuel injection timing, etc., so as to achieve an optimal combustion state in a variety of operation states. For enabling such controls, the ECU 250 is connected to the following sensors for detecting conditions of the vehicle.

The accelerator pedal of the vehicle is provided with an accelerator position sensor 172 that outputs voltage proportional to the amount of depression α of the accelerator pedal. A crank angle sensor 174 detects the rotation angle CA of a crankshaft, and outputs a pulse signal at every predetermined rotation angle of the crankshaft. The cylinder block 30 of the engine 10 is provided with a water temperature sensor 182 that detects the temperature T of cooling water of the engine 10.

The ECU 250 inputs the amount of depression α of the accelerator pedal, the degree of opening θ of the throttle valve 140, the engine rotation speed NE based on the crank angle CA, the water temperature T, the amount of intake air Q, the signals from the oxygen concentration sensors 170, and also inputs signals for determining the state of operation of the vehicle, for example, a signal from a vehicle speed sensor V (not shown) or the like, and then determines the amount of fuel injection τ to the fuel injection valves 100. The amount of fuel injection τ is determined by setting an injection duration based on the intake air amount Q from the air flow meter 115 and the signal CA from the crank angle sensor 174, and correcting the set injection duration on the basis of, for example, the information obtained through the water temperature sensor 182 regarding whether the engine 10 is in a cold state, the information obtained through the oxygen concentration sensors 170 regarding whether the air-fuel ratio is appropriate, etc. This embodiment adopts an independent injection method that allows the amounts of fuel injection τ of the cylinders 20 to be controlled independently of one another.

Figure 4:
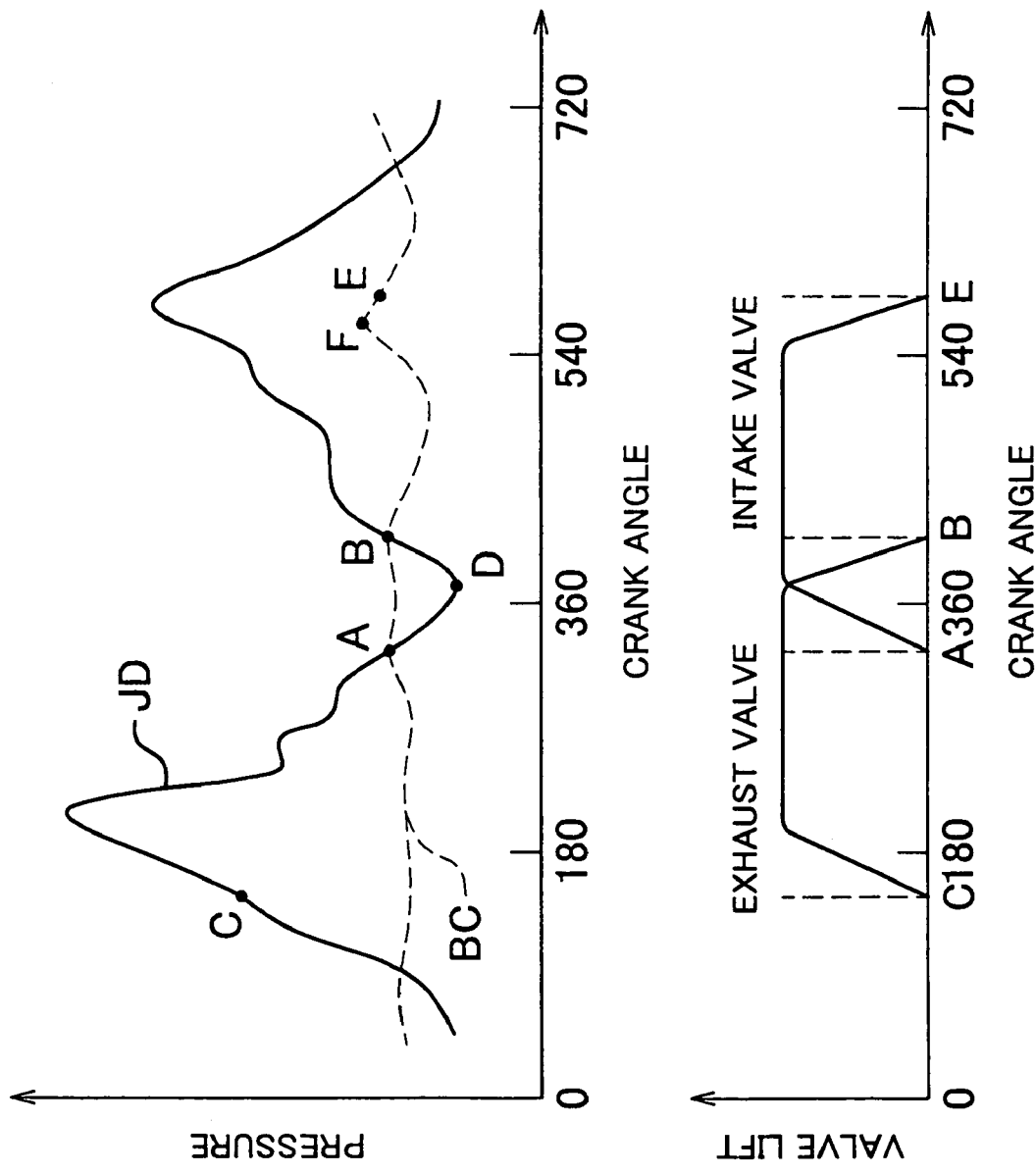
FIGS. 4A and 4B indicate relationships of crank angle with the intake pressure and the exhaust pressure.

Prior to the description of a valve timing control process executed in the invention, the pulsation of intake pressure and exhaust pressure will be described. FIG. 4A indicates relationships of the crank angle with the intake pressure and the exhaust pressure. FIG. 4B indicates a relationship between the crank angle and the amount of valve lift. In FIG. 4A, a solid line JD indicates the pressure in the exhaust port 75, and a broken line BC indicates the pressure in the intake port 65. As indicated in FIG. 4A, the pressure indicated by the solid line JD sharply increases immediately after the exhaust valve 70 has been opened. A positive pressure wave occurring when the valve is opened turns into a negative pressure wave due to reflection from an opening portion, and the negative pressure wave travels toward the exhaust valve 70, so that the pressure in the exhaust port 75 pulsates. Then the exhaust pressure reaches a minimum (point D in FIG. 4A), and rises due to propagation of pressure waves generated in other cylinders 20, and then falls again. During one cycle during which all the cylinders 20 undergo combustion therein, exhaust pulsation having multiple positive peaks and negative peaks as indicated in FIG. 4A occurs.

The pressure indicated by the broken line BC also pulsates as pressure waves generated by the opening and closing actions of the intake valves 60 and the actions of the piston 40, etc., are reflected at an opening portion. Like the exhaust pulsation, intake pulsation occurs which has a positive maximum peak around a crank angle of 540° during one cycle occurs, as shown in FIG. 4A. As for the intake pulsation and the exhaust pulsation, the appropriate setting of the exhaust valve opening timing C, the intake valve opening timing A, the exhaust valve closing timing B, and the intake valve closing timing E improves the efficiency of charging intake air into the cylinders 50, and therefore improves the performance of the engine 10. The control of determining the timing of each valve for improving the performance of the engine 10 will be sequentially described below.

Figure 5:
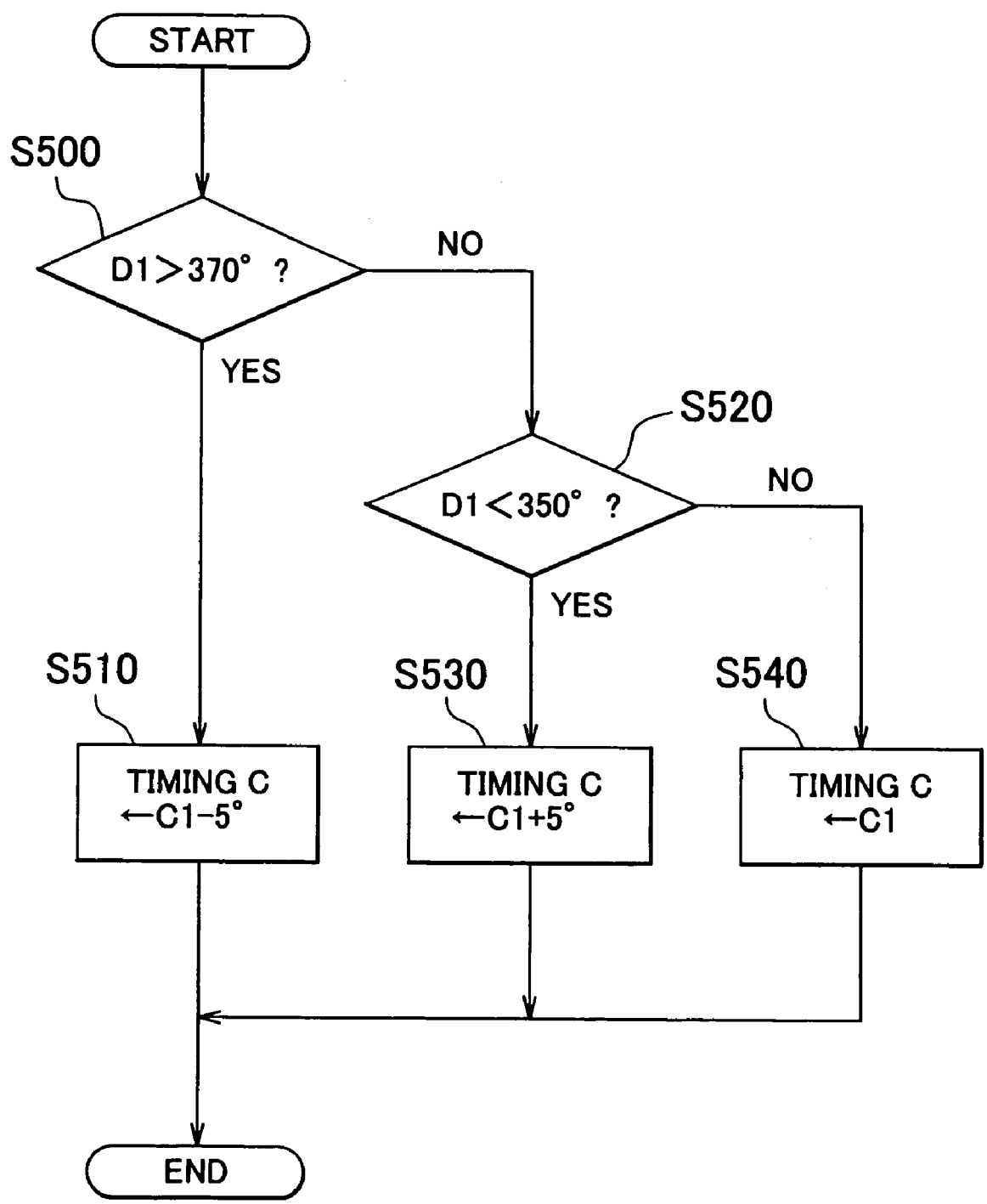
FIG. 5 is a flowchart of a process for determining an exhaust valve opening timing.

Firstly, a process of determining the timing C will be described. FIG. 5 shows a flowchart of a process of determining the timing C. In general, in order to effectively utilize the inertia of intake and exhaust, the intake and exhaust valve timing is set so that each intake valve 60 opens prior to the top dead center of the piston 40, and closes after the bottom dead center thereof, and so that each exhaust valve 70 opens prior to the bottom dead center of the piston 40, and closes after the top dead center. In this embodiment, the valve timing during an early period of operation of the vehicle is set as described above. After the engine 10 is started up with the aforementioned valve timing, the pressure sensors 231 detect the exhaust pressures corresponding to crank angles CA throughout one cycle during which all the cylinders 20 undergo combustion. The ECU 250 detects the crank angle CA at the time the exhaust pressure reaches the minimum pressure D during the cycle, and also records the opening timing C1 of the exhaust valve 70 in the same cycle.

At the time of entrance to the next cycle, a process illustrated in FIG. 5 will be executed. As illustrated in FIG. 5, it is determined whether the timing D1 that indicates the crank angle CA of the minimum value D during the previous cycle is within the range of 360°±10°. Specifically, it is first determined whether the timing D1 is greater than 370° (step S500). If the timing D1 is greater than 370°, the timing C is corrected by 5° to an advanced side from the previous-cycle timing C1 (step S510). After that, the process ends. If it is determined in step S500 that the timing D1 is less than or equal to 370°, it is subsequently determined whether the timing D1 is less than 350° (step S520). If it is determined in step S520 that the timing D1 is less than 350°, the timing C is corrected by 5° to a retarded side from the timing C1 (step S530). After that, the process ends. If it is determined in step S520 that the timing D1 is greater than or equal to 350° (i.e., if the timing D1 is within the range of 360°±10°), the timing C1 during the previous cycle is set as the timing C (step S540), after which the process ends. The above range (i.e., dead band in control) and the unit of correction (i.e., resolution unit in control) are not limited to the aforementioned values, that is, ±10° and ±5°, respectively, but may be set at other specific values.

FIG. 5 illustrate a procedure that the ECU 250 executes when retarding or advancing the opening timing C of the exhaust valves 70, and thereby adjusting the phase of exhaust pulsation so that the timing D corresponding to the minimum exhaust pressure is within the vicinity of the top dead center in intake stroke (i.e., near 360° in crank angle). In general, the timing at which the piston 40 is near the intake-stroke top dead center corresponds to an overlap period during which the intake valves 60 and the exhaust valves 70 are both open. If the pulsating pressure in the exhaust ports 75 reaches the minimum D during this period, it promotes burned gas remaining in the cylinder 20 to be drawn out, so that the scavenging efficiency improves and the intake charge efficiency improves accordingly.

Figure 6:
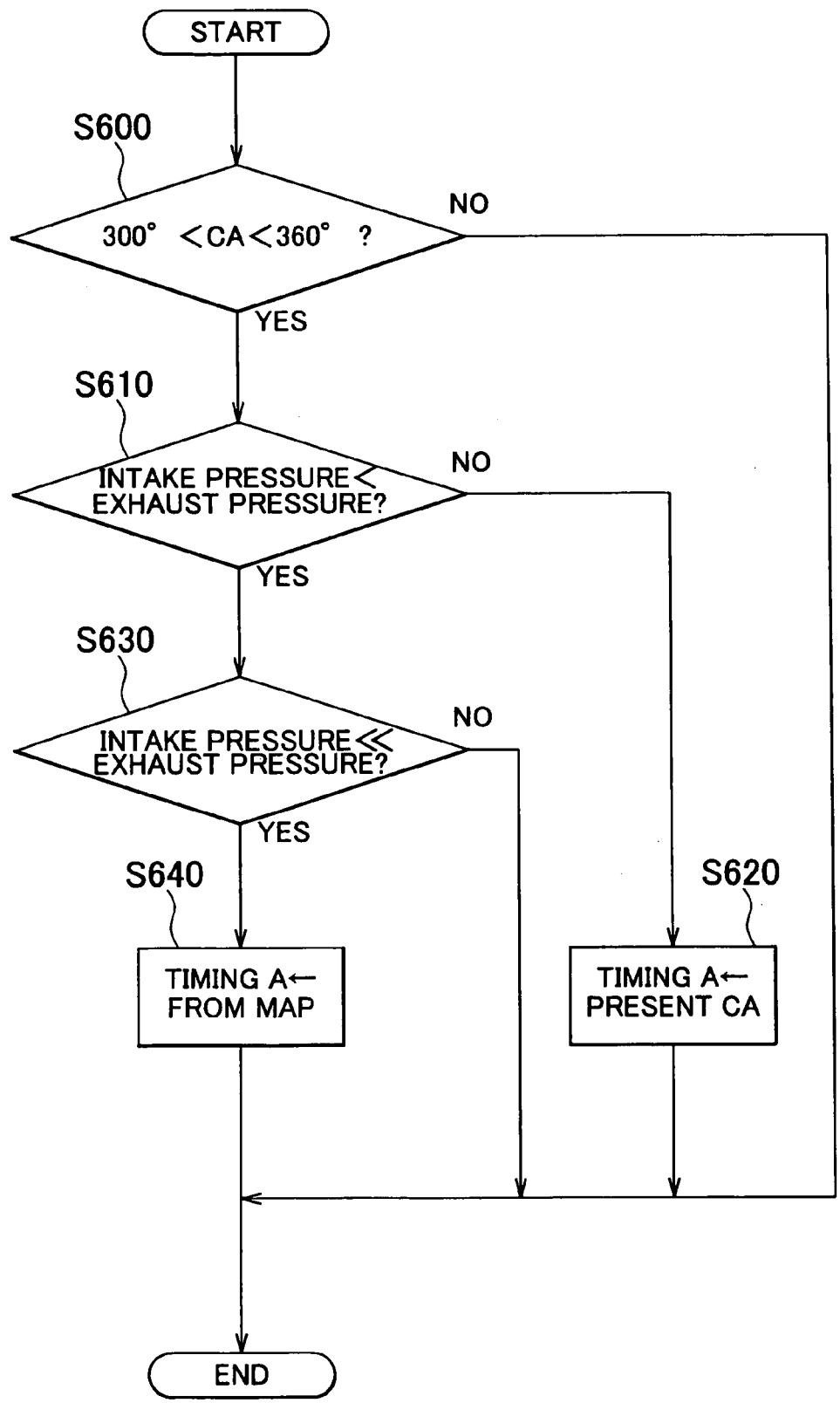
FIG. 6 is a flowchart of a process for determining an intake valve opening timing.
Figure 7:
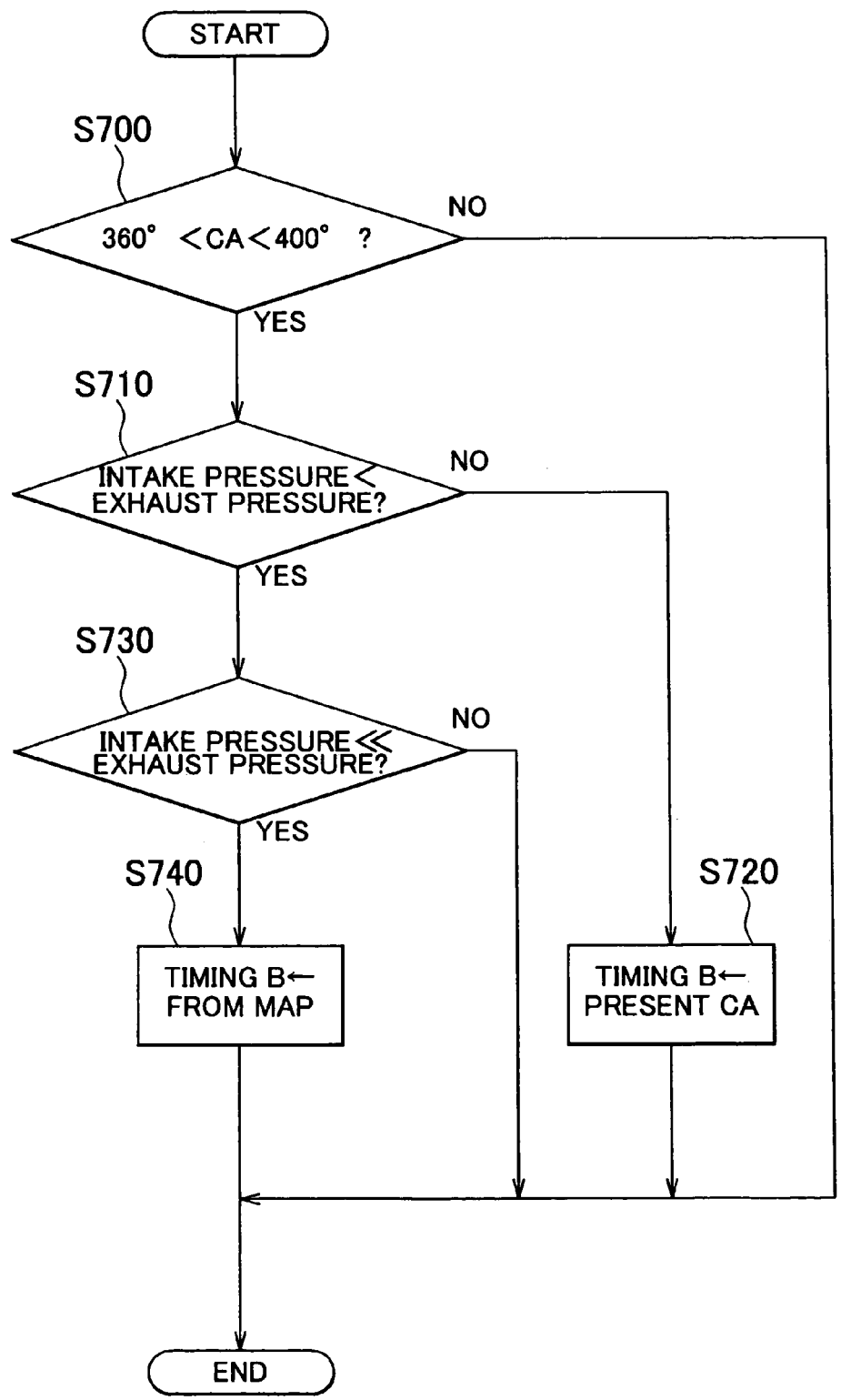
FIG. 7 is a flowchart of a process for determining an exhaust valve closing timing.

Next, procedures that the ECU 250 executes when determining the timing A and the timing B will be described. FIG. 6 is a flowchart showing the procedure for determining the timing A. FIG. 7 is a flowchart showing the procedure for determining the timing B. Since these procedures are substantially the same, the procedure for determining the timing A will be mainly described below with reference to FIG. 6.

The pressure sensors 230, 231 detect the intake pressure and the exhaust pressure corresponding to specific values of the crank angle CA. The ECU 250 executes the processes illustrated in FIG. 6, using signals indicative of the intake and exhaust pressures corresponding to the present crank angle CA. As illustrated in FIG. 6, it is determined whether the present crank angle CA is within a range of 300°<CA<360° (step S600). If the present crank angle CA is within this range, the exhaust pressure and the intake pressure at the present crank angle CA are then compared (step S610). If the intake pressure is greater than the exhaust pressure, the present crank angle CA is set as the timing A (step S620), after which the procedure ends.

If it is determined in step S610 that the intake pressure is smaller than the exhaust pressure, the magnitude relationship between the two pressures is checked again (step S630). For example, if the rotation speed of the engine 10 is high and the back pressure in the exhaust system is high, the exhaust pressure becomes high. In contrast, the intake pressure does not become so high since the intake pressure is not substantially affected by the back pressure in the exhaust system. Therefore, in some cases, the intake pressure does not become higher than the exhaust pressure. If it is determined in step S630 that there is not any point where the intake pressure becomes higher than the exhaust pressure, the timing A is determined from a map pre-stored in ECU 250 (step S640). After that, the procedure ends.

If it is determined in step S600 that the present crank angle CA is not within the range, or if it is determined in step S630 that there is a point where the intake pressure becomes higher than the exhaust pressure (i.e., if the engine rotation speed is low), the procedure ends. After that, this procedure is repeated with the next crank angle CA. In this embodiment, the criterion used for the determination in step S630 is whether the engine speed is above or below 4000 rpm. However, it may instead be whether a difference between the mean value of the exhaust pulsation during one cycle and the mean value of the intake pulsation during one cycle is less than or equal to a predetermined value.

The procedure for determining the timing B illustrated in FIG. 7 only differs from that for determining the timing A in the range (360°<CA<400°) used in the determination regarding the present crank angle CA (step S700) and the map used for determining the timing B (step S740). Therefore, the timing B is determined substantially in the same manner as the timing A.

Through execution of the procedures illustrated in FIGS. 6 and 7, the opening timing A of the intake valves 60 and the closing timing B of the exhaust valves 70 become timings at which the intake pressure exceeds the exhaust pressure. Since the intake and exhaust valves are open during a state where the intake port pressure is high and the exhaust port pressure is low, both the discharge of burned gas from the cylinders to the exhaust ports 75 and the inflow of fresh air from the intake ports 65 into the cylinders 20 are accelerated. Therefore, the intake charge efficiency can be improved.

Figure 8:
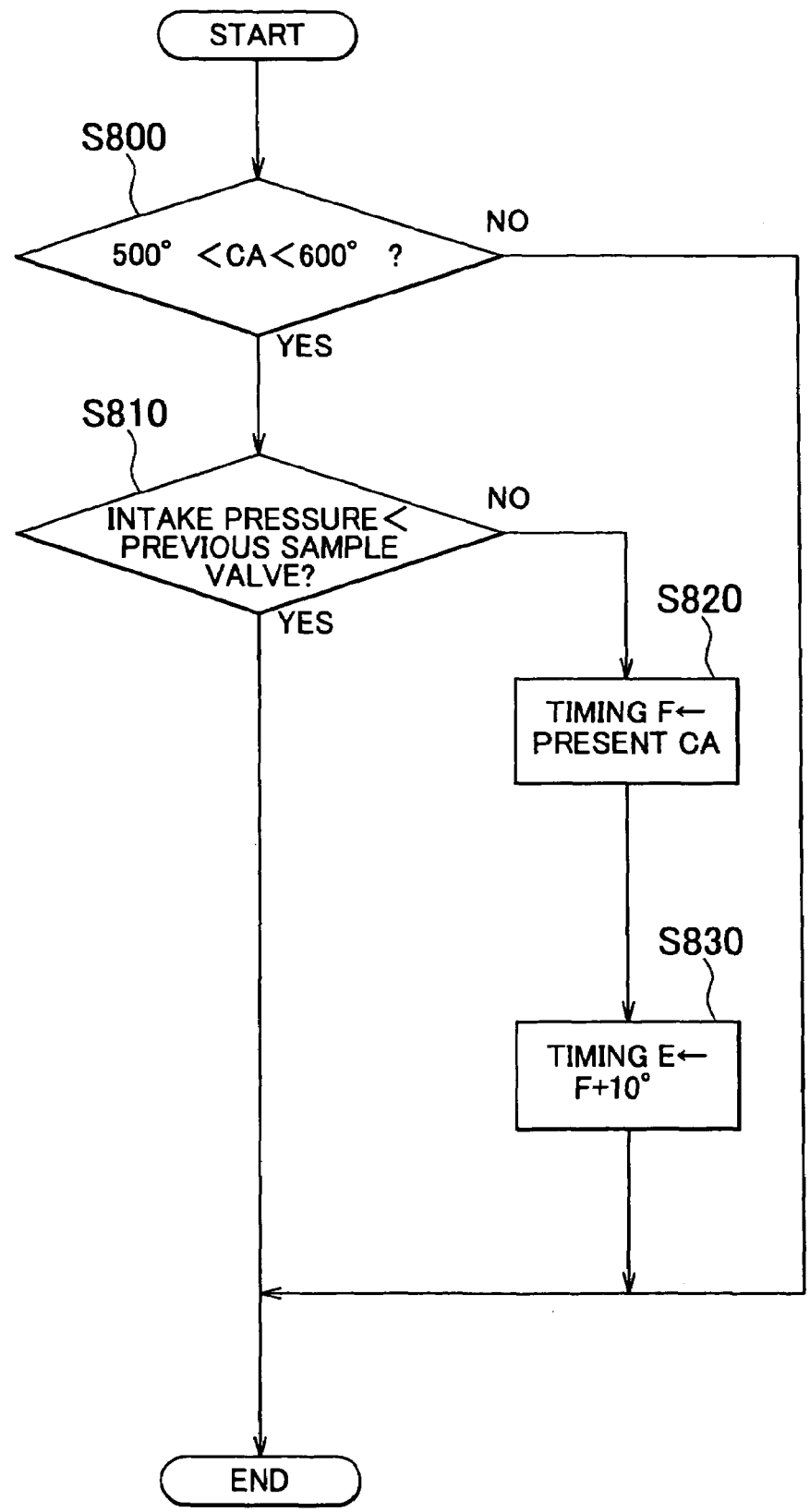
FIG. 8 is a flowchart of a process for determining an intake valve closing timing.

A procedure for determining the timing E will next be described. FIG. 8 shows a flowchart shoring the same procedure. The ECU 250 executes the procedure using sensor signals indicative of the intake pressure corresponding to the present crank angle CA. Referring to FIG. 8, it is determined whether the present crank angle CA is within a range of 500°<CA<600° (step S800). If the present crank angle CA is within this range, it is subsequently determined whether the intake pressure corresponding to the present crank angle CA is at its maximum level (step S810). This determination is made by comparing the present intake pressure (the intake pressure corresponding to the present crank angle CA) with the previous sample value, namely which is the intake pressure corresponding to a previous crank angle CAO). Specifically, the crank angle CA detected at the time the intake pressure increasing monotonously begins to decrease is determined to correspond to the maximum intake pressure. If the intake pressure is the maximum intake pressure, the present crank angle CA is set as a timing F (step S820). Subsequently, a predetermined amount is added to the timing F in order to determine the timing E (step S830). After that, the procedure ends. This predetermined amount is equivalent to a crank angle CA of 10° in the retarding direction (E=timing F+10°). This predetermined amount is not limited to 10°, but may also be set at a desired set value.

If it is determined in step S800 that the present crank angle CA is not within the range, or if it is determined in step S810 that the present intake pressure is greater than the previous sample value, and is therefore not at the maximum level, the procedure ends. After that, the procedure is repeated with the next crank angle CA.

Through execution of the procedure illustrated in FIG. 8, the closing timing E of the intake valves 60 is set at a timing that is a predetermined crank angle CA in the retarding direction from the angle corresponding to the maximum intake pressure in the intake pulsation. At the timing F at which the intake pressure is at the maximum level during the intake pulsation, fresh air is readily charged into the cylinders 20 since the intake port pressure is maximum. Due to the dynamic effect of the intake pulsation, the fresh air has inertia. Therefore, closing the intake valves 60 at the timing E that is an angle retarded from the maximum intake pressure angle by a predetermined amount, achieves a maximum improvement in the intake charge efficiency. Furthermore, since the intake port pressure is relatively high, the mixture charged in the cylinders 20 will not flow back to the intake ports 65.

Figure 9:
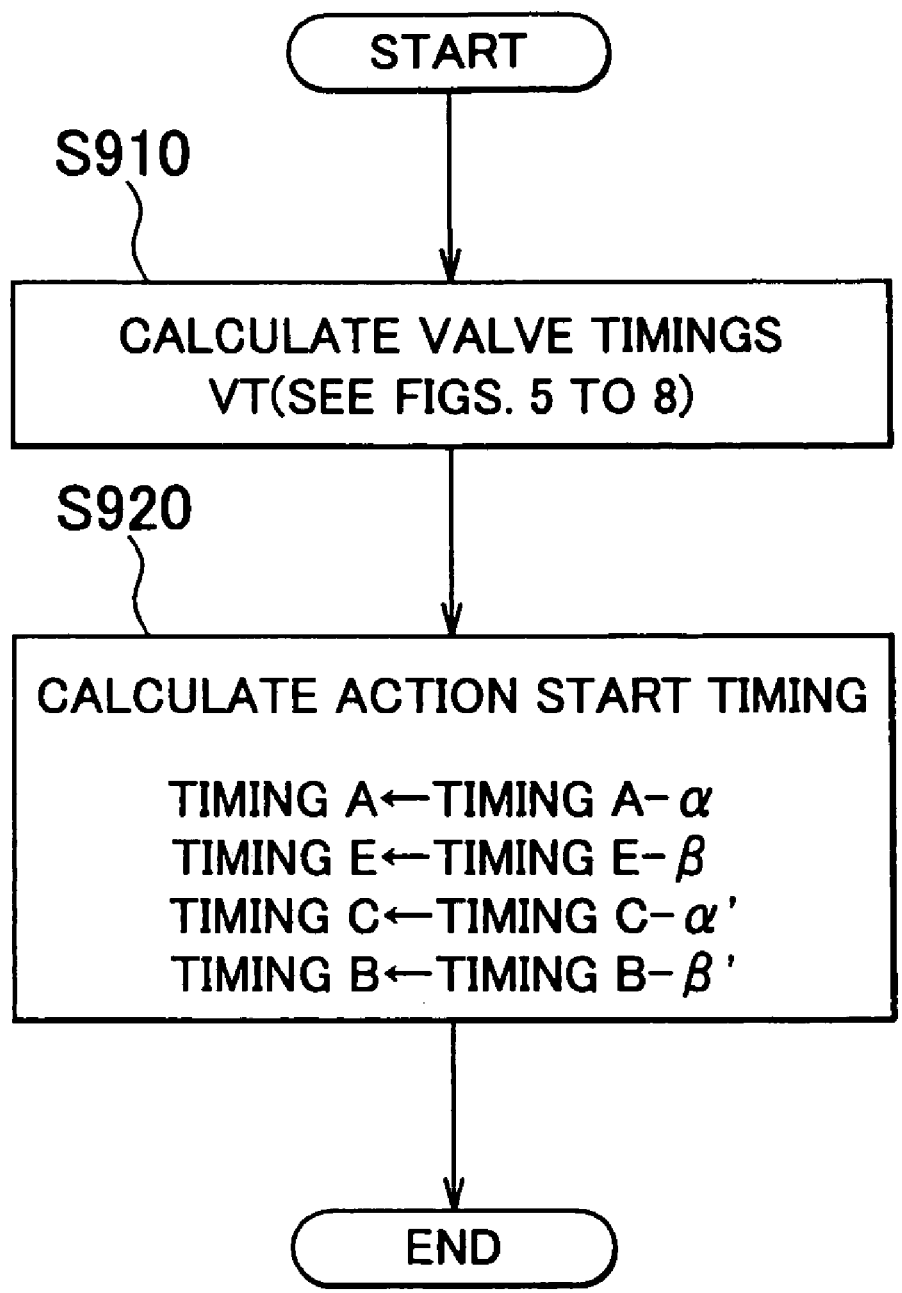
FIG. 9 is a flowchart illustrating a valve start timing control in accordance with a second embodiment.

In a second embodiment of the invention, the instructions output to the electromagnetic valve actuation mechanisms 200, 201 are corrected on the basis of the opening and closing timings of the intake and exhaust valves determined through the procedures described in the first embodiment above, so that the valve opening action starts in accordance at the determined timing and the valve closing action is completed at the determined timing. FIG. 9 shows a flowchart illustrating a procedure that further includes a process of making such correction. The second embodiment adopts the same system construction applied to the internal combustion engine, as the first embodiment. Therefore, components and the like of the second embodiment equivalent to those of the first embodiment are indicated by the same reference characters, and views illustrating such components or their configuration are not provided.

During an initial operation state of the vehicle, the engine 10 is operated using valve timings that are preset design values. The ECU 250 executes the procedure illustrated by the flowchart of FIG. 9 using the intake pressure and exhaust pressure detected by the pressure sensors 230, 231 during the aforementioned initial operation state of the vehicle.

Here, it is to be noted that this procedure is not performed only for a specific one of the cylinders 20, but for all of them. Referring to FIG. 9, the valve timings C, A, B, E are determined using the intake pressure and exhaust pressure in the same manner as described in the first embodiment (step S910). Subsequently, in order to ensure the valves will be opened or closed at the determined timings, the timings are corrected to factor in the response delay or transition time of the intake valves 60 and the exhaust valves 70 (step S920), and instructions corresponding to the timings corrected are finally output to the electromagnetic valve actuation mechanisms 200, 201, after which procedure ends.

FIGS. 10A to 10C illustrate such response delays and transition time of valve operation with respect to the crank angle CA which are observed while opening and closing of each valve. Referring to FIGS. 10A to 10C, when the magnetizing current to the upper electromagnetic coil 300 is discontinued and, after a predetermined time, magnetizing current is supplied to the lower electromagnetic coil 310, the valve begins to open at a timing T2, as indicated in FIGS. 10A to 10C. Thus, the beginning of action of the valve is preceded by a response delay of $\alpha=T2-T1$. When the magnetizing current to the lower electromagnetic coil 310 is discontinued and, after a predetermined time, magnetizing current is supplied to the upper electromagnetic coil 300, the valve finishes closing at a timing T4. Thus, completion of the closing action of the valve is preceded by a transition time of $\beta=T4-T3$. Therefore, the valve opening timings C, A are corrected by subtracting a crank angle $\alpha$-equivalent amount, and the valve closing timings B, E are corrected by subtracting a crank angle $\beta$-equivalent amount. Taking into account the difference between the intake-side electromagnetic valve actuation mechanism 200 and the exhaust-side electromagnetic valve actuation mechanism 201, the crank angles $\alpha$, $\beta$ are set as amounts of correction on the intake side, and the crank angles $\alpha'$, $\beta'$ are set as amounts of correction on the exhaust side.

As described above, the electromagnetic valve actuation mechanisms 200, 201 are supplied with current at the timings determined so as to factor in response delays and transition time of the valve operation, thus assuring improved accuracy in setting the valve timings. As for the valve closing timings B, E in particular, a control is performed such that the valve closing action ends at the valve closing timings. Therefore, it is possible to set valve timings with increased precision. Also, the crank angles $\alpha$, $\alpha'$, $\beta$, $\beta'$, are set to specific values that have been determined through experiments in accordance with various rotation speeds and loads.

Figure 11:
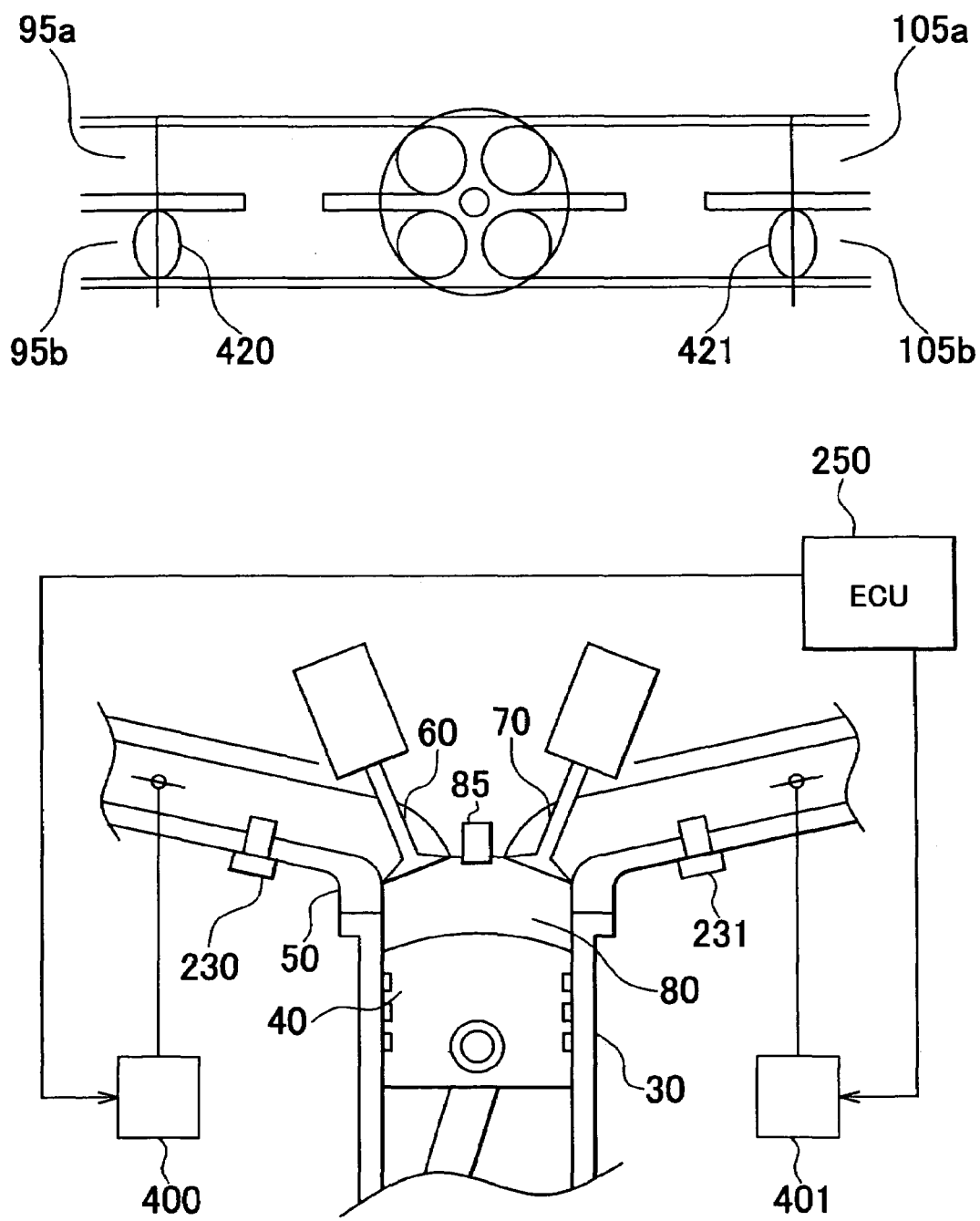
FIG. 11 is a schematic longitudinal sectional view of a cylinder of a system equipped with an internal combustion engine in accordance with a third embodiment of the invention.

FIG. 11 is a view showing vertical section of a cylinder of an internal combustion engine in accordance with a third embodiment of the invention. In the third embodiment, the intake system and the exhaust system described above in the first embodiment are modified into variable intake and exhaust systems. Other components and portions of the third embodiment are substantially the same as those of the first embodiment, and are indicated by the same reference characters, and will not be described again. The intake system and the exhaust system in the third embodiment are equipped with valves 420, 421 for changing the pipe length of an intake passageway 95 and an exhaust passageway 105. The intake passageway 95 has a long branch 95a having a longer conduit line, and a short branch 95b having a shorter conduit line. The valve 420 is provided in the passageway of the short branch 95b, and opens and closes the passageway. The exhaust passageway 105 has a long branch 105a having a longer conduit line, and a short branch 105b having a shorter conduit line. As in the intake passageway, the valve 421 is provided in the passageway of the short branch 105b. The valves 420, 421 and connected to actuators 400, 401, respectively.

Each of the actuators 400, 401 has a rod (not shown), and is electrically connected to the ECU 250. Each actuator 400, 401 expands and contracts the rod in accordance with a command from the ECU 250. An end of the rod of each actuator is connected to a corresponding one of the valves 420, 421 via a link (not shown). That is, each actuator 400, 401 expands or contracts the rod in accordance with a command from the ECU 250, so that the corresponding valve 420, 421 opens or shuts off the passageway of the short branch. When the passageway of the short branch of the intake or exhaust side is open, the pipe length of the intake or exhaust side is short. If the passageway of the short branch is closed, the pipe length is relatively long. The ECU 250 determines the intake pipe length and the exhaust pipe length from the engine rotation speed NE and the load KL determined from the intake air amount Q, and outputs corresponding commands to the actuators 400, 401. In the variable intake-exhaust system, the period and the amplitude of intake and exhaust pulsation are changed by varying the pipe length, so as to improve the intake charge efficiency.

Figure 12:
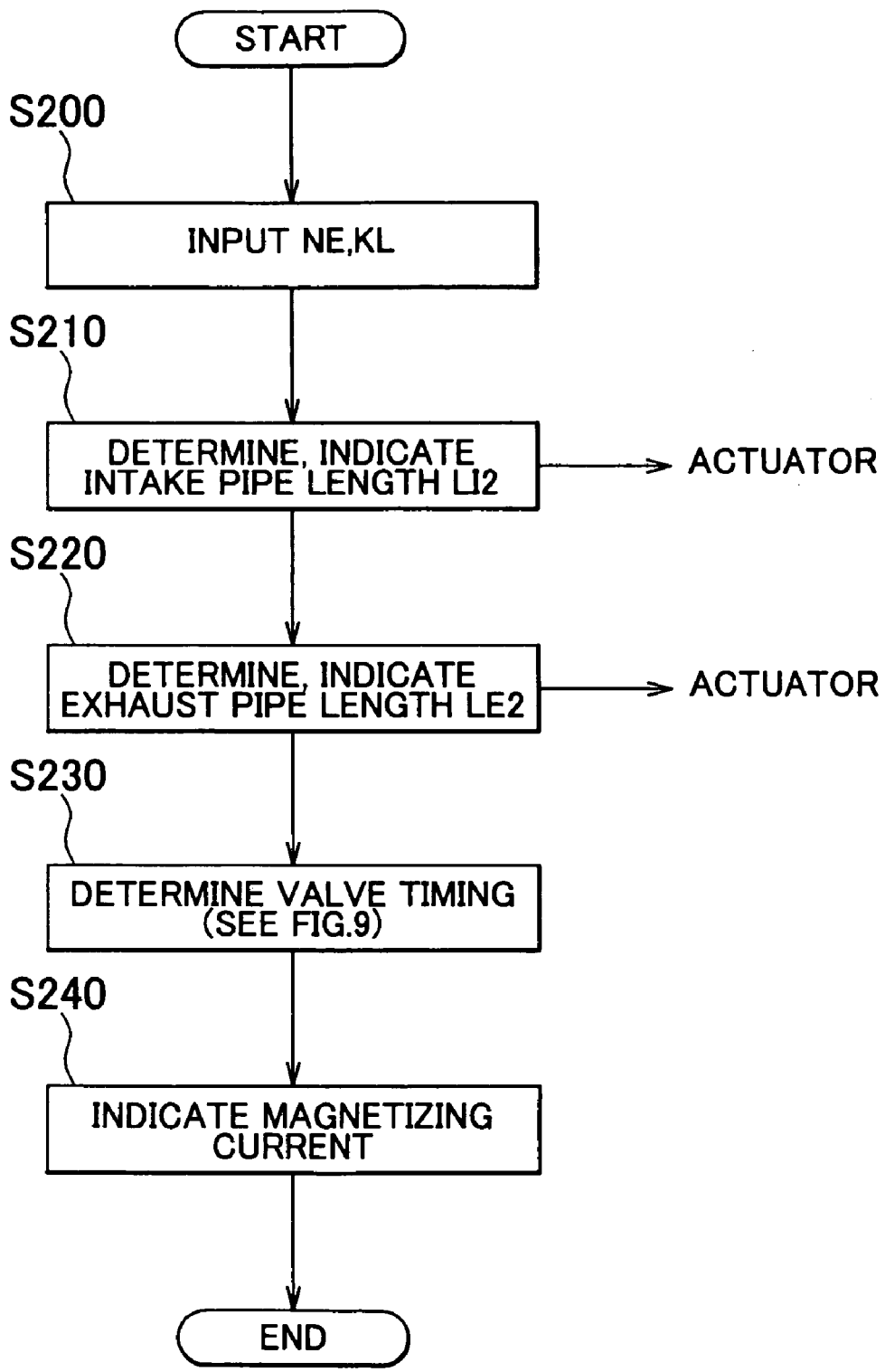
FIG. 12 is a flowchart illustrating a valve timing control in accordance with the third embodiment.

FIG. 12 shows a flowchart showing a procedure that the ECU 250 executes to determine valve timings in the third embodiment. First, the ECU 250 inputs the engine rotation speed NE and the load KL (step S200). More specifically, the ECU 250 calculates the engine rotation speed NE from the crank angle CA, and calculates the load KL from the intake air amount Q. Subsequently, the ECU 250 retrieves from a memory region (not shown) a map indicating a relationship among the engine rotation speed NE, the load KL and the intake and exhaust pipe length L, and determines the intake pipe length LI2 and the exhaust pipe length LE2, and outputs appropriate instructions to the actuators 400, 401 (steps S210, S220). The actuators 400, 401 change the intake pipe length from LI1 to LI2 and the exhaust pipe length from LE1 to LE2 by, for example, closing the valves 420, 421. In accordance with changes in the pipe length, the period and amplitude of the intake pulsation and the exhaust pulsation change. The varied pulsating pressure is detected by the pressure sensors 230, 231. On the basis of the pressure, the valve timing is determined (step S230). The setting of valve timing is accomplished by executing the procedure showin in FIG. 9. Then, instructions are issued such that the electromagnetic valve actuation mechanisms 200, 201 are supplied with magnetizing current at the timings determined in the above manner factoring in response delays and transition time of valve operation (step S240).

With a variable intake and exhaust system, as described above, it is possible to determine valve timings over a relatively broad range so that they correspond to changes in the period and amplitude of the exhaust pulsation and intake pulsation. Furthermore, there is no need to preset valve timings corresponding to such changes in the intake and exhaust pipe lengths, since the timings are set based on the pressures detected each time, so the occupied region of the memory of the ECU 250 can be reduced.

FIG. 13 illustrates a case where the valve timing control is executed with the exhaust system varied. In FIG. 13, a solid line JL indicates exhaust pulsation occurring with the long exhaust pipe length, and a broken line JS indicates exhaust pulsation occurring with the short exhaust pipe length, and a one-dot chain line indicates intake pulsation. Referring to FIG. 13, the period during which the intake pressure is greater than the exhaust pressure can be adopted as an overlap period, regardless of variations of the exhaust pulsation depending on various pipe lengths. In the exhaust pulsation JL in particular, a long overlap period is provided so that the charge efficiency improves.

Furthermore, in the third embodiment, an abnormality in the actuators 400, 401, such as a failure, a malfunction, etc., can be determined. FIG. 14 shows a flowchart of an abnormality determination procedure for a variable intake system. An abnormality determination process for a variable exhaust system is substantially the same as the procedure illustrated in FIG. 14, and will not be described. The procedure illustrated in FIG. 14 is executed by the ECU 250 at a predetermined timing. The ECU 250 learns beforehand the closing timings of the intake valves 60 corresponding to various engine rotation speeds NE, various loads KL and various intake pipe lengths L, and stores the learned timings in a memory region (not shown). In this embodiment, the closing timings of the intake valves 60 corresponding to engine rotation speeds NE, loads KL and intake pipe lengths L in the past operations of the vehicle are learned. The valve timings obtained in experiments or the like in correspondence to varied engine rotation speeds NE, varied loads KL and varied intake pipe lengths L may be stored.

The ECU 250 inputs the engine rotation speed NE and the load KL (step S400), and recognizes the present designated intake pipe length (e.g., LI2) from the engine rotation speed NE and the load KL. Subsequently, the ECU 250 retrieves a timing that meets the aforementioned conditions from the memory region, and thereby inputs a learned timing G (step S410). After that, a difference ΔVT between the learned timing G and the present closing timing E of the intake valves 60 is compared with a predetermined threshold value (step S420). If the absolute value of the difference ΔVT is less than or equal to 10°, it is determined that the variable intake system is normally operating (step S430). After that, the process ends.

If the difference ΔVT between the learned timing G and the present the closing timing E is greater than 100, it is determined that the variable intake system has a failure or malfunction, and a warning lamp is turned on (step S440). After that, the process ends. According to the valve timing control of the invention, even if a malfunction or the like impedes variation of the intake pipe length, an appropriate valve timing in such a state is realized. Through comparison of this valve timing with a pre-learned valve timing, an abnormality, such as a malfunction or the like, can be determined, so that a process of turning on the warning lamp or the like can be performed. It is to be noted that for the comparison in step S420, the opening timing of the intake valves 60 may be used. For the determination regarding an abnormality of the variable exhaust system, it is appropriate to perform the comparison of the closing timings or opening timings of the exhaust valves 70.

Although in the foregoing embodiments, the pressure sensors 230, 231 are provided separately for individual cylinders 20, this arrangement is not restrictive. For example, it is possible to provide pressure sensors 230, 231 only for a predetermined cylinder 20. For example, in the case of a four-cylinder engine, the first cylinder is provided with pressure sensors 230, 231. From the pulsating intake and exhaust pressures detected by the pressure sensors, valve timings of the first cylinder are determined. The valve timings are reflected for the subsequent cylinder (the third cylinder, the fourth cylinder, and the second cylinder) in the sequence of combustion.

Although in the foregoing embodiment, the variable intake/exhaust system is a switching type in which the pipe length is changed via a valve, it is also possible to use various other types of variable intake/exhaust systems, for example, a slide type in which the pipe length is varied in the direction of a straight line, a bellows type in which bellows-shaped portions are provided in the intake and exhaust pipes, and the pipe length is varied, etc., while achieving substantially the same advantages.

What is claimed is:

1. An internal combustion engine, comprising:
   a cylinder;
   a piston;
   an intake valve;
   an exhaust valve;
   a variable valve timing mechanism enabling an operation timing of at least one of the intake valve and the exhaust valve to be changed;
   a pressure detector that detects an intake pressure and an exhaust pressure within the internal combustion engine, each pulsates due to the actions of the piston, the intake valve, and the exhaust valve; and
   a controller that sets the operation timing based on a magnitude relationship between the intake pressure and the exhaust pressure detected by the pressure detector.

2. The internal combustion engine according to claim 1, wherein the setting of the operation timing is such that a timing of completing an opening or closing action of the valve is determined based on the magnitude relationship between the intake pressure and the exhaust pressure detected by the pressure detector, and a timing of starting such action of the valve is set so as to complete the action of the valve at the determined timing.

3. The internal combustion engine according to claim 1, wherein the controller is adapted to set a timing of opening the exhaust valve such that a negative pressure wave forming a local minimal pressure portion of the exhaust pressure pulsating in the cylinder of the internal combustion engine reaches a vicinity of the exhaust valve when the piston is generally at the top dead center during an exhaust stroke.

4. The internal combustion engine according to claim 1, wherein the controller is adapted to set a timing of closing the intake valve based on a time when a positive pressure wave forming a local maximal pressure portion of the intake pressure pulsating in the cylinder of the internal combustion engine reaches a vicinity of the intake valve.

5. The internal combustion engine according to claim 1, further comprising a variable intake/exhaust system that enables to change at least one of an effective length and an inside diameter of each one of an intake passage and an exhaust passage of the internal combustion engine.

6. The internal combustion engine according to claim 5, wherein the controller is further adapted to determine whether the variable intake/exhaust system has an abnormality based on at least one of the intake pressure and the exhaust pressure detected by the pressure detector.

7. The internal combustion engine according to claim 1, wherein
   the cylinder is provided in plurality, and
   the pressure detector includes sensors provided in intake and exhaust passages for each cylinder so as to detect the intake and exhaust pressures.

8. The internal combustion engine according to claim 1, wherein the variable valve timing mechanism is configured to open and close the valve using an electromagnetic force.

9. A method for controlling combustion of an internal combustion engine including a cylinder, a piston, an intake valve, an exhaust valve, and a variable valve timing mechanism capable of changing a timing of operating at least one of the intake valve and the exhaust valve, the method comprising:

detecting an intake pressure and an exhaust pressure within the internal combustion engine which pulsate due to the actions of the piston, the intake valve, and the exhaust valve; and setting the operation timing of each valve based on a magnitude relationship between the intake pressure and the exhaust pressure.

10. The method according to claim 9, wherein the setting of the operation timing is such that a timing of completing an opening or closing action of the valve is determined based on the magnitude relationship between the intake pressure and the exhaust pressure, and a timing of starting such action of the valve is set so as to complete the action of the valve at the determined timing.

11. The method according to claim 9, wherein a timing of opening the exhaust valve is set such that a negative pressure wave forming a local minimal pressure portion of the exhaust pressure pulsating in the cylinder of the internal combustion engine reaches a vicinity of the exhaust valve when the piston is generally at the top dead center during an exhaust stroke.

12. The method according to claim 9, wherein a timing of closing the intake valve is set based on a time when a positive pressure wave forming a local maximal pressure portion of the intake pressure pulsating in the cylinder of the internal combustion engine reaches a vicinity of the intake valve.

13. The method according to claim 9, wherein the internal combustion engine further includes a variable intake/exhaust system that enables to change at least one of an effective length and an inside diameter of each one of an intake passage and an exhaust passage of the internal combustion engine, and it is determined whether the variable intake/exhaust system has an abnormality based on at lease one of the intake pressure and the exhaust pressure detected by the pressure detector.

14. An internal combustion engine comprising:

a cylinder;

a piston;

an intake valve;

an exhaust valve;

a variable valve timing means for changing an operation timing of at least one of the intake valve and the exhaust valve;

a pressure detecting means for detecting an intake pressure and an exhaust pressure within the internal combustion engine, each pulsates due to the actions of the piston, the intake valve, and the exhaust valve; and a controlling means for setting the operation timing based on a magnitude relationship between the intake pressure and the exhaust pressure detected by the pressure detecting means.

\* \* \* \* \*